Jan. 19, 1954     E. S. CHAMER     2,666,725
BRAZING FLUX
Filed Nov. 30, 1951
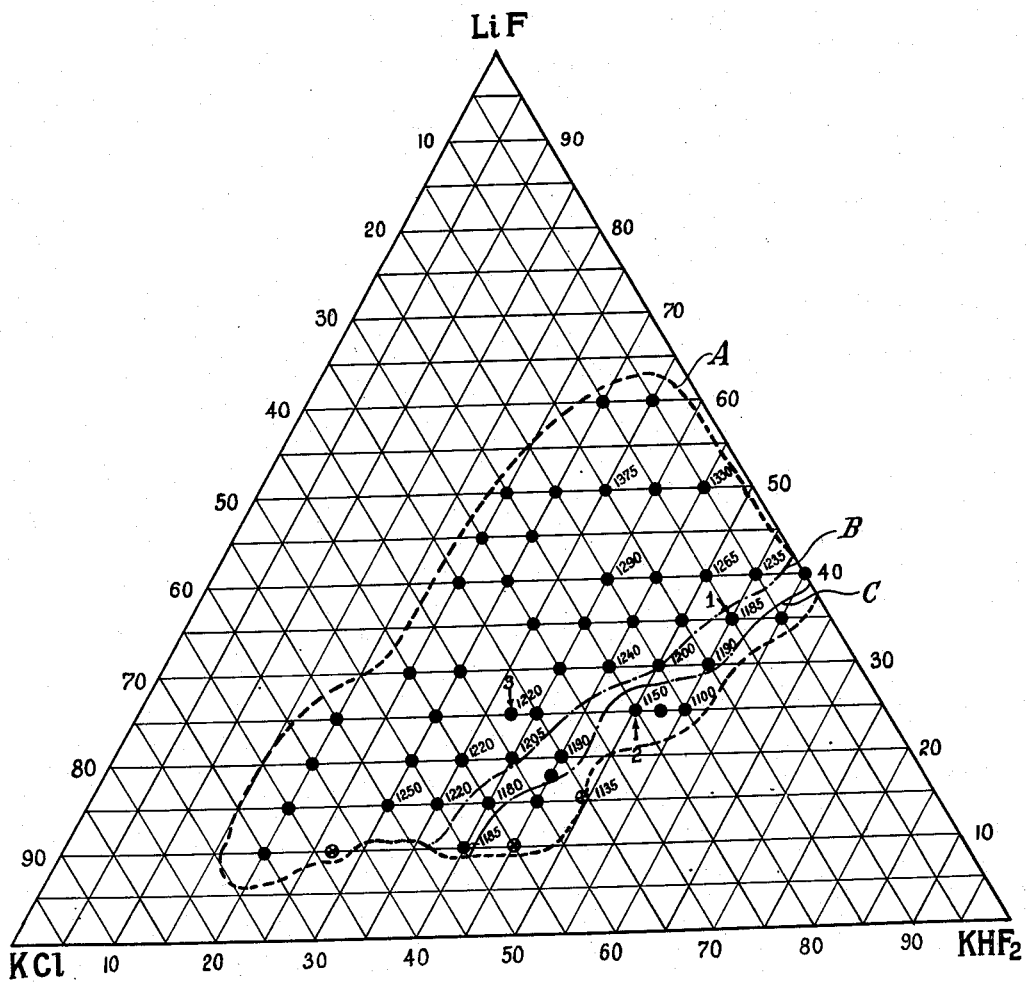
INVENTOR
Ernest S. Chamer
BY
Pennie Edmonds Morton, Barrows & Taylor
ATTORNEYS Patented Jan. 19, 1954

2,666,725

UNITED STATES PATENT OFFICE 2,666,725

BRAZING FLUX

Ernest S. Chamer, Fairfield, Conn., assignor to Handy & Harman, New York, N. Y., a corporation of New York Application November 30, 1951, Serial No. 259,037

6 Claims. (Cl. 148—26)

This invention relates to brazing by means of silver brazing alloys of the common commercial types and is concerned more particularly with a novel brazing flux, the use of which makes possible the successful silver alloy brazing of titanium and related metals. By the expression "titanium and related metals," I refer to titanium and zirconium, and alloys containing the metals named as their principal components.

Titanium and related metals cannot be brazed by commercial silver brazing alloys and the fluxes ordinarily employed therewith, because, when such brazing filler metals are melted on the surface of titanium and related metals under the usual fluxes, the molten metal balls up and fails to wet the surfaces to be joined. As a result, no union of the surfaces can be effected, regardless of the temperatures employed.

I have found that molten silver brazing alloys may be caused to wet the surfaces of titanium and related metals, so that strong joints may be formed, by the use of a flux containing a novel mixture of chlorides, fluorides, and bifluorides of lithium and potassium. When the new flux is used, the brazing operation may be carried on with ordinary acetylene torch or furnace heating methods.

In the new flux, the proportions of lithium, potassium, fluorine, and chlorine may vary considerably but must be kept within certain limits, since not all mixtures of the constituent elements will promote wetting of titanium and related metals by the brazing alloys. Also, it is important that the proportions in the flux mixture be kept within limits in order to obtain fluxes of desirable low fluid points.

The composition of the new flux may best be understood by reference to the accompanying drawing, in which the single figure is a ternary diagram of the system LiF, KCl, and KHF$_2$ and the dotted line curve A is a boundary of the area which includes the compositions effective as fluxes. In the diagram, the small solid circles represent specific compositions, of which those numbered 1, 2, and 3 are preferred in that order. The numbers accompanying certain of the solid circles are the fluid points of the respective compositions in degrees Fahrenheit and the dot-and-dash lines B and C are isothermal fluid point lines. Of the preferred compositions, that numbered 1 contains 35% LiF, 10% KCl, and 55% KHF$_2$ by weight and its fluid point is 1185° F. Composition 2 contains 25% LiF, 25% KCl, and 50% KHF$_2$ by weight and its fluid point is 1150° F., while Composition 3 contains 25% LiF, 37.5% KCl, and 37.5% KHF$_2$ by weight and has a fluid point of 1220° F. In the diagram, the compositions represented by a circle enclosing a cross are less satisfactory than the compositions represented by the solid circles in promoting solder flow.

Although the diagram is expressed in terms of the compounds LiF, KCl, and KHF$_2$, it is to be understood that the elements K, Li, Cl, and Fl can be employed in combinations other than the specific compounds referred to, as, for example, LiCl and KF may be employed in place of part of the KCl and LiF, respectively. The essential characteristic of the new flux is that it consists essentially of the elements Cl, Fl, K, and Li which are present in the same proportions as in the amounts of the compounds KCl, KF, and KHF$_2$ in the compositions within the area bounded by curve A in the diagram.

The new flux contains the basic mixture above described and may include minor amounts of other compounds. Small percentages of chlorides or fluorides of Zn, Cd, Ag, Ni, and other metals less active than Ti neither benefit nor harm the braze but boron additions of any kind are deleterious. The flux should also be devoid of oxygen compounds, except for a small amount of moisture. The Na ion may be present but it is undesirable, because of the yellow glare, which it imparts to the torch flame.

The new flux is preferably made up as a paste by ball milling the salts together in the presence of sufficient water to produce a brushable mixture.

While I have described the new flux as particularly adapted for use in the silver alloy brazing of titanium and zirconium and their alloys, the flux is also useful in such brazing of hafnium and thorium and alloys, of which these metals form the principal components.

By the term "fluid point" as used in connection with the new flux, I mean the temperature, at which the flux is sufficiently fluid to be readily usable in brazing. This temperature is, in many cases, somewhat higher than the melting point or the temperature, at which the flux beings to change from the solid to a molten state.

I claim:

1. A flux for use in the silver alloy brazing of titanium and related metals, which consists essentially of salts containing the elements K, Li, H, Fl, and Cl in the same weight proportions that said elements are present in the compounds KCl, KHF$_2$ and LiF making up the compositions lying approximately within the area defined in the accompanying drawing by the line A.

2. A flux for use in the silver alloy brazing of titanium and related metals, which consists essentially of LiF, KCl, and $KHF_2$ present in the same weight proportions as in the compositions lying approximately within the area defined in the accompanying drawing by the line A.

3. A flux for use in the silver alloy brazing of titanium and related metals, which consists of LiF, KCl and $KHF_2$ in which the individual components are present in amounts within the ranges of 25% to 35% of LiF, 10% to 37.5% KCl, and 37.5% to 55% $KHF_2$ by weight.

4. A flux for use in the silver alloy brazing of titanium and related metals, which consists of 35% LiF, 10% KCl, and 55% $KHF_2$ by weight.

5. A flux for use in the silver alloy brazing of titanium and related metals, which consists of 25% LiF, 25% KCl, and 50% $KHF_2$ by weight.

6. A flux for use in the silver alloy brazing of titanium and related metals, which consists of 25% LiF, 37.5% KCl, and 37.5% $KHF_2$ by weight.

ERNEST S. CHAMER.

References Cited in the file of this patent

UNITED STATES PATENTS

| Number | Name | Date |
|---|---|---|
| 2,243,424 | Horowitz | May 27, 1941 |